United States Patent
Hui et al.

(10) Patent No.: US 8,526,992 B2
(45) Date of Patent: Sep. 3, 2013

(54) ZERO-FORCING LINEAR BEAMFORMING FOR COORDINATED CELLULAR NETWORKS WITH DISTRIBUTED ANTENNAS

(75) Inventors: Dennis Hui, Cupertino, CA (US); Kambiz Zangi, Chapel Hill, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 519 days.

(21) Appl. No.: 12/746,372

(22) PCT Filed: Jan. 8, 2008

(86) PCT No.: PCT/SE2008/050019
§ 371 (c)(1), (2), (4) Date: Jun. 4, 2010

(87) PCT Pub. No.: WO2009/088328
PCT Pub. Date: Jul. 16, 2009

(65) Prior Publication Data
US 2010/0279729 A1 Nov. 4, 2010

(51) Int. Cl.
*H04W 52/30* (2009.01)
(52) U.S. Cl.
USPC .................................... 455/522; 455/562.1
(58) Field of Classification Search
None
See application file for complete search history.

(56) References Cited

U.S. PATENT DOCUMENTS

| | | | |
|---|---|---|---|
| 7,786,936 B2 * | 8/2010 | Kurokawa | 342/458 |
| 2006/0210070 A1 | 9/2006 | Reznik et al. | |
| 2007/0149236 A1 * | 6/2007 | Naden et al. | 455/522 |
| 2008/0273618 A1 * | 11/2008 | Forenza et al. | 375/261 |

FOREIGN PATENT DOCUMENTS

| EP | 1737141 A2 | 12/2006 |
|---|---|---|
| WO | 2006055719 A2 | 5/2006 |

OTHER PUBLICATIONS

International Search Report for PCT/SE2008/050019, dated Dec. 19, 2008.
Hwang, I., et al., "A New Practical Dirty-Paper Coding Strategy in MIMO System," Information Sciences and Systems, CISS '07, 41st Annual Conference, Mar. 14-16, 2007, pp. 125-129.
Caire, G., et al., "On the Achievable Throughput of a Multiantenna Gaussian Broadcast Channel," IEEE Transactions on Information Theory, vol. 49, No. 7, Jul. 2003, pp. 1691-1706.
Stojnic, M., et al., "Rate Maximization in Multi-Antenna Broadcast Channels with Linear Preprocessing," IEEE Transactions on Wireless Communications, vol. 5, No. 9, Sep. 2006, pp. 2338-2342.

* cited by examiner

*Primary Examiner* — Philip Sobutka
(74) *Attorney, Agent, or Firm* — Potomac Patent Group PLLC

(57) ABSTRACT

In a distributed antenna system that includes a plurality of transmitters and a controller, a method, performed by the controller, may be characterized by performing dirty-paper coding on downlink transmissions to users based on an order of the users, calculating beamforming vectors to provide that each of the downlink transmissions associated with each of the users does not interfere with other users, and maximizing, based on the calculated beamforming vectors, a data rate subject to a power constraint of the distributed antenna system.

37 Claims, 6 Drawing Sheets

ZERO-FORCING LINEAR BEAMFORMING FOR COORDINATED CELLULAR NETWORKS WITH DISTRIBUTED ANTENNAS

TECHNICAL FIELD

The concepts described herein may relate to methods and arrangements in a network. In particular, the concepts described herein may relate to methods and arrangements for distributed antennas (DA) in a coordinated cellular network.

BACKGROUND

In a coordinated cellular system, a DA arrangement may employ various schemes to control other-cell interference. In one approach, Costa-precoding (also known as dirty-paper coding (DPC)) followed by zero-forcing beamforming (ZFBF) may be employed to regulate downlink signals transmitted to users so as to minimize mutual interference among users of respective cell origins. In this scheme, a network produces the signals to be transmitted to different users in a pre-determined order (e.g., a signal for user 1 is produced first, a signal for user 2 is produced next, etc.). A significant constraint with a DPC-ZFBF scheme is that a signal transmitted to, for example, user (i), must not create interference at the antennas of all other users who preceded user (i) according to the pre-determined order.

A cellular environment may include, among other things, a network having (t) transmitters, and (m) mobile devices having (r) receiving antennas per mobile device. For example, the cellular environment may include users (i) (i=1, 2, ..., m) corresponding to the mobile devices. Each mobile device may be in a different cell, and the transmitters can send independent messages to the mobile devices. One or more of the transmitters may not be co-located.

For purposes of discussion, assume there is an average total power constraint (P) at the transmitters. The Gaussian broadcast channel (GBC) may be an additive noise channel and each time sample can be represented by the following expression:

$$y_i = H_i x + n_i \quad i=1, 2, \ldots, m, \tag{1}$$

where (x) is a vector of size (t*1) that represents the total signal transmitted from all of the transmitters. Under a total average power constraint at the transmitters, it may be required that the $E[x^\dagger x] < P$. $Y_i$ is the output vector received by users (i). The output vector is a vector of size (r*1). $H_i$ is a fixed matrix channel for users (i) whose size is (r*t). These channel matrices are fixed and known at the transmitters and the mobile devices. $N_i$ is a Gaussian, circularly symmetric, complex-valued random noise vector with a zero mean and a covariance of $\sigma_i^2 I$.

For purposes of discussion, assume that the total number of transmit antennas equals the total number of receive antennas (i.e., t=r*m), and that (r) independent streams are transmitted to each mobile device. Thus, t=r*m independent streams may be transmitted in total. Additionally, let ($x_j$) denote the symbols of the j-th transmitted stream with power ($q_j$), and ($\Phi_i$) ={j|$x_j$ belongs to users (i)}. Associated with each transmitted stream ($x_j$) is a transmitted beamforming vector ($V_j$). Thus, the total transmitted signal may be represented by the following expression:

$$x = \sum_{j=1}^{t} x_j V_j. \tag{2}$$

Assume that ($V_j$) has unit norm. The signal transmitted for users (i) may be represented by the following expression:

$$x_i = \sum_{j \in \Phi_i} x_j V_j, \tag{3}$$

and the covariance of the signal transmitted for users (i) may be represented by the following expression:

$$S_i = \sum_{j \in \Phi_i} V_j V_j^\dagger q_j, \tag{4}$$

and the covariance of the total transmitted signal x may be represented by the following expression:

$$S = \sum_i S_i. \tag{5}$$

Beamforming Rates

A description of achievable rates with beamforming is provided. Under the assumptions that the symbols in different streams are independent and identically distributed (i.i.d.) Gaussian random variables that are chosen independently from each other, a maximum rate that can be delivered to users (i) may be calculated. For example, the received vector at users (i) can be represented by the following expression:

$$y_i = H_i x_i + H_i \sum_{j=1}^{} x_j + n_i. \tag{6}$$

The sum of the last two terms in expression (6) are colored Gaussian noise (e.g., the noise values are correlated in some fashion) for users (i) with a covariance $R_i = \sigma_i^2 I + H_i(\Sigma_{j \neq 1} S_j) H_i^\dagger$. Thus, the maximum data rate that can be delivered reliably to users (i) may be represented by the following expression:

$$R_i^{BF} = \log \frac{\det\left(I + H_i\left(\sum_j S_j\right)H_i^\dagger\right)}{\det\left(I + H_i\left(\sum_{j=1} S_j\right)H_i^\dagger\right)}. \tag{7}$$

The beamforming rate region refers to all the m-tuples of rates $\{R_i^{BF}\}_{i=1}^m$ in expression (7) obtained by all possible combinations of beamforming weights $V'_j s$ and powers $q_j s$. The beamforming rate region is clearly a sub-set of the capacity region of the GBC.

Rates with Costa-Precoding and Beamforming

A description of achievable rates with Costa-precoding and beamforming is provided. As previously described, Costa-precoding entails an encoding of messages for different users at the transmitters according to a certain order. For purposes of discussion, assume that a message for a user 1 is encoded first, a message for a user 2 is encoded second, etc. Since a transmitter is used to form all of the transmitted messages, at the time the message for user (i) is to be formed (i.e., encoded), the messages from all users (j<i) have been already formed. Thus, these messages are known by the transmitter prior to encoding the message for user (i). Further, the transmitter is assumed to know the channel to the i-th user. Accordingly, the interference that is seen by user (i) from the messages (or symbols) transmitted for users (j<i) is known at the transmitter prior to encoding the message for user (i). Based on this known interference, Costa-precoding allows the transmitter to pre-code the symbols for user (i) to significantly reduce the impact of the interference from users (j<i) at the mobile device of user (i). Additionally, Costa-precoding may not require any increase in the transmitted power. In one implementation, Costa-precoding may utilize, for example, low-density parity-check (LDPC) codes and superposition coding.

Consider a scalar point-to-point channel that is represented by the following expression:

$$y = cx + s + z, \tag{8}$$

where (c) is a complex-valued channel coefficient that is known both to the transmitter and the mobile device: (s) and (z) are independent Gaussian noise with (s) known non-causally at the transmitter, but not known at the mobile device; and (z) is unknown to both the transmitter and the mobile device. For purposes of discussion, assume a total transmitted power constraint of $E|x|^2 < P_0$. Under this framework, the capacity of this channel is the same as the additive white Gaussian noise (AWGN) channel, expressed as $y = cx + z$. That is, possessing the transmitter side information of (s) at the transmitter may be equivalent to knowing (s) both at the transmitter and the mobile device. Thus, with Costa pre-coding, the mobile device can achieve the same rate as with the AWGN channel, and with the total transmit power remaining below (P).

Returning to user (i), consider the received signal at the i-th user, represented by the following expression:

$$y_i = H_i x_i + H_i \left( \sum_{j<1} x_j \right) + H_i \left( \sum_{j>1} x_j \right) + n_i. \tag{9}$$

At the transmitter, the messages are encoded for users (i) sequentially (e.g., in the order of (1, 2, ..., m)). At the time of encoding the message for user (i), the second term in expression (9) is known to the transmitter since this term involves transmitted symbols from previously encoded users. However, for user (i), this second term can be considered interference that is known at the transmitter, but not at the mobile device. Hence, Costa pre-coding can be applied to transmissions from users (j<i), and the effective channel seen by user (i) may be represented by the following expression $$y_i = H_i x_i + H_i \left( \sum_{j>1} x_j \right) + n_i. \tag{10}$$

If Costa pre-coding and beamforming at the transmitter is employed, the effective colored Gaussian noise seen by the i-th mobile device has a covariance $\sigma_i^2 I + H_i (\Sigma_{j>1} S_j) H_i^\dagger$, and the resulting maximum data rate that can be reliably transmitted to user (i) may be represented by the following expression:

$$R_i^{BF-Costa} = \log \frac{\det\left(I + H_i \left( \sum_j S_j \right) H_i^\dagger\right)}{\det\left(I + H_i \left( \sum_{j>1} S_j \right) H_i^\dagger\right)}. \tag{11}$$

The Costa-precoding/beamforming rate region is defined as all rate m-tuples $\{R_i^{BF-Costa}\}_{i=1}^m$ achieved by arbitrary choices of beamforming vectors ($V_j$s), power allocation across streams ($q_j$s), and precoding order. In this regard, the Costa-precoding/beamforming rate region may coincide with the capacity region of the GBC. In other words, Costa-precoding followed by linear beamforming can be used to achieve any point in the capacity region of the GBC subject to a total transmitted power constraint.

There is a difference between a Costa-precoding for a scalar-valued channel (e.g., as indicated in expression (8)), and a pre-coding for known vector interference in the vector channel (e.g., as indicated in expression (9)). However, using the fact that Minimum Mean Square Error (MMSE) receivers with successive cancellation are capacity-achieving for a Multiple-In Multiple-Out (MIMO) channel (with or without transmitter side channel state information), decomposition of the vector-valued MIMO channel in expression (9) may be achieved in several parallel Single-In Single-Out (SISO) channels (e.g., one SISO channel for each of the streams belonging to a given user). Since each of these SISO channels can be considered a scalar-valued channel, scalar Costa-precoding for known scalar interference can be applied to each of the SISO channels.

Zero-Forcing Beamforming Vectors for Costa-Precoding/Beamforming

In Costa-precoding (CP)-ZFBF, CP will be used to encode the symbols for user (i) such that user (i) will effectively see no interference from users (j<i). The combined effect of using CP followed by ZFBF is that user (i) effectively sees no interference from signals transmitted to all other users.

For purposes of finding the optimal ZFBF vectors for CP-ZFBF, assume that the total transmitted power by all of the streams of user (i) is less than ($P_i$). In this regard, for user (i), finding (in) beamforming vectors such that:

Requirement (1)—The transmitted signal by user (i) deposits no interference at antennas of all users (j<i); and Requirement (2)—The data achieved by user (i) is maximized may be desirable.

Under one approach, a composite channel matrix may be defined, for example, the composite channel matrix may be represented by the following expression:

$$\overline{H} = \begin{bmatrix} H_1 \\ H_2 \\ \vdots \\ H_m \end{bmatrix}. \tag{12}$$

Next, let $\overline{H} = GQ$ by employing a QR decomposition of $\overline{H}$. In one implementation, a Gram-Schmidt orthogonalization to the rows of $\overline{H}$ may be employed, where Q is a unitary matrix and G is a lower triangular matrix. The beamforming vector for the j-th stream may then be chosen as the j-th column of the unitary matrix $Q^\dagger$. Due to the Gram-Schmidt process, the i-th column of matrix $Q^\dagger$ is orthogonal to the first (i−1) rows of H (i.e. V; will be orthogonal to all the antennas of the users coming before the user associated with the i-th stream).

The beamforming vectors obtained under this approach may result in no interference deposited by user (i) on all the users (j<i). That is, the beamforming weights, under this approach, may satisfy requirement (1), as described above. However, the beamforming vectors do not satisfy requirement (2).

That is, the beamforming vectors for the first user can be chosen freely. Thus, the rate delivered to the first user is maximized by choosing these beamforming vectors to be the singular vectors of matrix $H_1$ having (r) largest singular values. However, the beamforming vectors obtained through the QR decomposition of $\overline{H}$ are completely different from the optimal beamforming vectors for user 1.

Under another approach, a matrix Q whose rows are the channels to the users (j<i) may be represented by the following expression:

$$Q_i = \begin{bmatrix} H_1 \\ H_2 \\ \vdots \\ H_{i-1} \end{bmatrix}. \quad (13)$$

In view of the above, the beamforming vectors for user (i) belong to the null space of matrix $Q_i$. Thus, the beamforming vectors for user (i) can be set as the projection of the rows of $H_i$ on the null space of $Q_i$ that are closest to the rows of $H_i$. That is, the beamforming vectors for user (i) may be chosen as those vectors in the null space of matrix $Q_i$ that are closest to the rows of $H_i$.

The beamforming vectors obtained under this approach may result in no interference deposited by user (i) on all the users (j<i). That is, the resulting beamforming vectors may satisfy requirement 1. However, these beamforming vectors do not satisfy requirement 2.

As a result of the foregoing, neither of the approaches for choosing the beamforming vectors for CP-ZFBW maximize the data rate that will be delivered to the users. Accordingly, an approach for maximizing the data rate delivered to user (i), while, at the same time, making sure that user (i) does not create interference to users (j<i), would be beneficial.

SUMMARY

It is an object to obviate at least some of the above disadvantages and to improve the operation of a network.

According to one aspect, in a distributed antenna system (100) that includes a plurality of transmitters (115) and a controller (110), a method, performed by the controller (110), may be characterized by performing dirty-paper coding on downlink transmissions to users based on an order of the users, calculating beamforming vectors to provide that each of the downlink transmissions associated with each of the users does not interfere with all other users, and maximizing, based on the calculated beamforming vectors, a data rate subject to a power constraint of the distributed antenna system (100).

According to yet another aspect, a controller (110) for coordinating data transmissions by antennas (310) of a distributed antenna system (100), the controller (110) may be characterized by a memory (220) to store instructions, and a processor (200) to execute the instructions. The processor (200) may execute instructions to select beamforming vectors associated with the distributed antenna system (100) for transmission of data to users, where the beamforming vectors do not cause data transmissions to interfere with each other, and to maximize, based on the selection of beamforming vectors, a data rate.

According to yet another aspect, a computer-readable medium may contain instructions executable by a controller (110) associated with base stations (115) of a distributed antenna system (100), the computer-readable medium may be characterized by one or more instructions for calculating beamforming vectors related to downlink transmissions to users located in a plurality of cells based on an order of the users, and one or more instructions for maximizing a data rate subject to a transmit power constraint of the distributed antenna system (100).

As a result of the foregoing, maximum data rates may be delivered to users in a coordinated network with a distributed antenna system (100). Additionally, maximum data rates may be delivered while maintaining various power constraints.

DETAILED DESCRIPTION

The following detailed description refers to the accompanying drawings. The same reference numbers in different drawings may identify the same or similar elements. Also, the following description does not limit the invention. The term "component," as used herein, is intended to be broadly interpreted to include software, hardware, or a combination of hardware and software.

Figure 1:
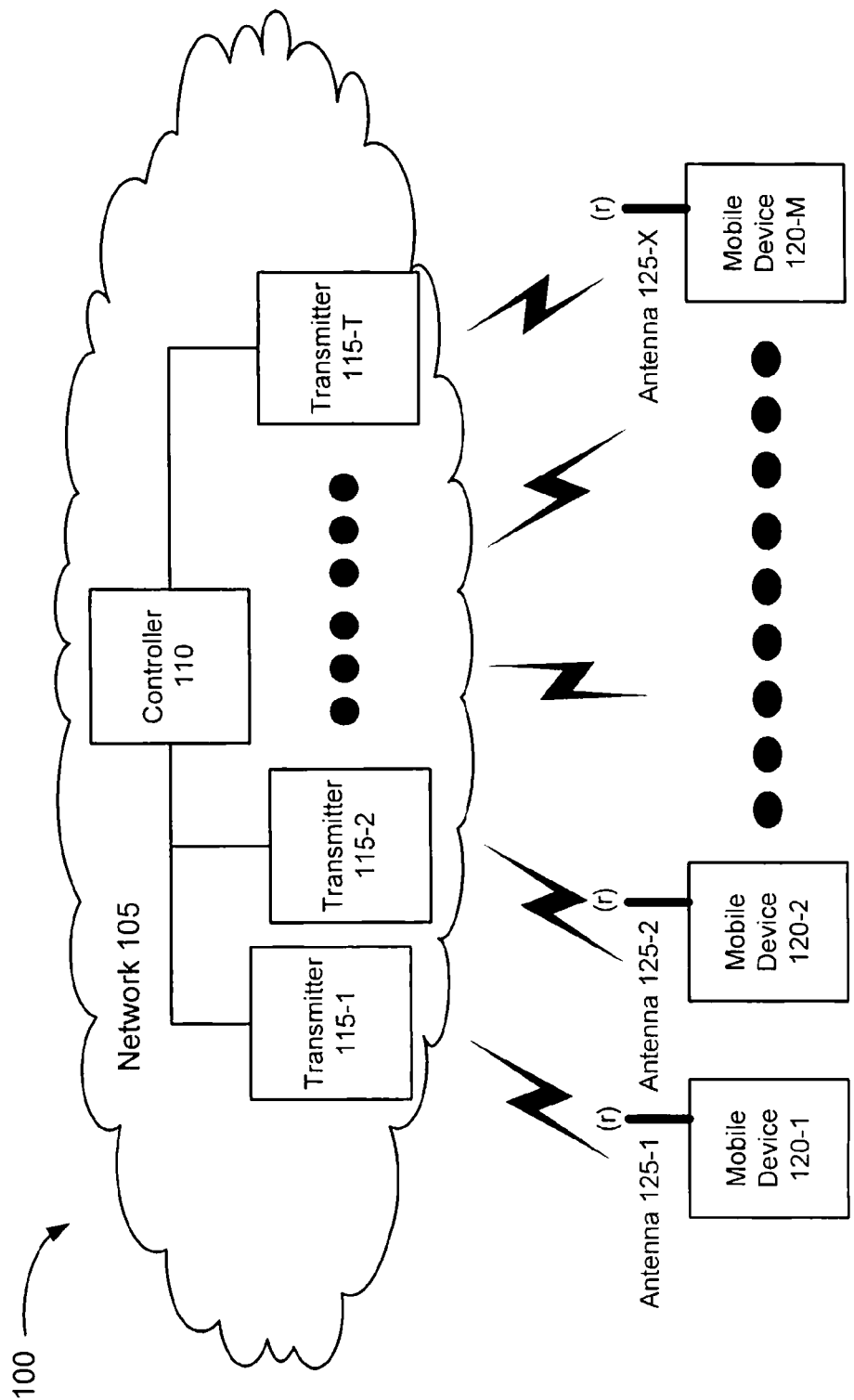
FIG. 1. is a diagram of an exemplary environment that may be associated with concepts described herein.

FIG. 1 illustrates an exemplary environment 100. In one implementation, environment 100 may correspond to a wireless environment. While not illustrated, environment 100 may include other systems and/or networks.

As illustrated in FIG. 1, environment 100 may include, among other things, a network 105 including a controller 110 and transmitters 115-1 to 115-T (collectively referred to as transmitters 115, and in some instances, individually as transmitter 115), and mobile devices 120-1 to 120-M (collectively referred to as mobile devices 120, and in some instances, individually as mobile device 120) including receiving antennas 125-1 to 125-X (collectively referred to as receiving antennas 125, and in some instances, individually as receive antenna 125).

Network 105 may include, for example, a wireless network. In one implementation, network 105 may include a cellular network that includes a distributed antenna system (DAS).

Controller 110 may include one or more devices that coordinate the operation of the DAS. For example, controller 110 may coordinate the transmission of data via transmitters 115.

Controller 110 may store downlink channel information for every transmit antenna to every mobile device 120 in the DAS.

Transmitters 115 may include devices for communicating with mobile devices 120. In one implementation, each transmitter 115 may correspond to a base station. Transmitters 115 may connect to controller 110 via, for example, a wired connection. Collectively, transmitters 115 form the DAS. Transmitters 115 may not be co-located.

Mobile devices 120 may include mobile terminals by which users may receive data from transmitters 115 in environment 100. Mobile devices 120 may include, for example, a mobile phone, a personal digital assistant (PDA), a mobile computer, a laptop, and/or another type of handset or communication device. In other instances, mobile devices 120 may include a vehicle-mounted terminal. Each mobile device 120 may include one or more receiving antennas 125 to establish and maintain a radio link with one or more transmitters 115. For example, each mobile device 120 may include (r) receiving antennas 125. Each mobile device 120 may be in a different cell of environment 100.

Although FIG. 1 illustrates an exemplary environment 100, in other implementations, fewer, additional, or different devices may be employed. Additionally, or alternatively, one or more devices of environment 100 may perform one or more functions described as being performed by one or more other devices of environment 100.

Figure 2:
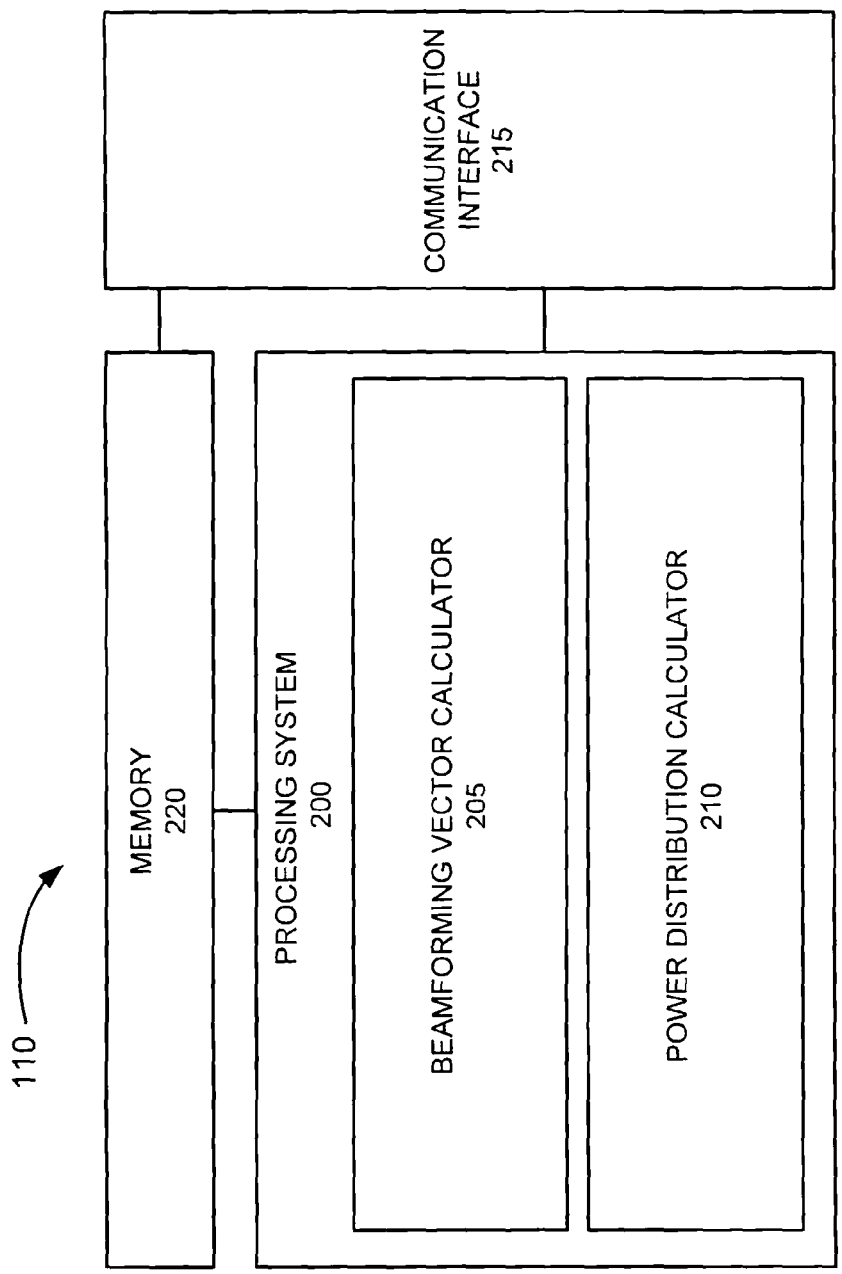
FIG. 2 is a diagram illustrating exemplary components that may correspond to the controller depicted in FIG. 1.

FIG. 2 is a diagram illustrating exemplary components controller 110. For example, controller 110 may include a processing system 200 having a beamforming vector calculator 205 and a power distribution calculator 210, a communication interface 215, and a memory 220. Controller 110 may include additional and/or different components than the components illustrated in FIG. 2.

Processing system 200 may control the operation of controller 110. For example, processing system 200 may include a general-purpose processor, a microprocessor, a data processor, a co-processor, a network processor, an application specific integrated circuit (ASIC), a controller, a programmable logic device, a chipset, a field programmable gate array (FPGA), or any other component or group of components that may interpret and execute instructions.

Beamforming vector calculator 205 may calculate beamforming vectors based on, for example, the exemplary expressions described below. Power distribution calculator 210 may calculate distribution of power among transmitted streams based on, for example, the exemplary expressions described below.

In one implementation, beamforming vector calculator 205 and/or power distribution calculator 210 may be implemented as software. In another implementation, beamforming vector calculator 205 and/or power distribution calculator 210 may be implemented as hardware. In still other implementations, beamforming vector calculator 205 and power distribution calculator 210 may be implemented as a combination of hardware and software.

Communication interface 215 may include any transceiver-like mechanism that enables controller 110 to communicate with other devices and/or systems. For example, communication interface 215 may include a radio interface, an optical interface, an Ethernet interface, a coaxial interface, or some other type of interface for wired or wireless communication. In other words, communication interface 215 may allow for wired and/or wireless communication. Communication interface 215 may contain a group of communication interfaces to handle multiple traffic flows.

Memory 220 may include any type of unit that stores data and instructions related to the operation and use of controller 110. For example, memory 220 may include a storing unit, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Although FIG. 2 illustrates exemplary components of controller 110, in other implementations, one or more components of controller 110 may be a component of a device other than controller 110. Additionally, or alternatively, the functionality associated with beamforming vector calculator 205 and power distribution calculator 210, as to be described more fully below, may be employed in a distributed fashion between or among more than one device of environment 100.

Figure 3:
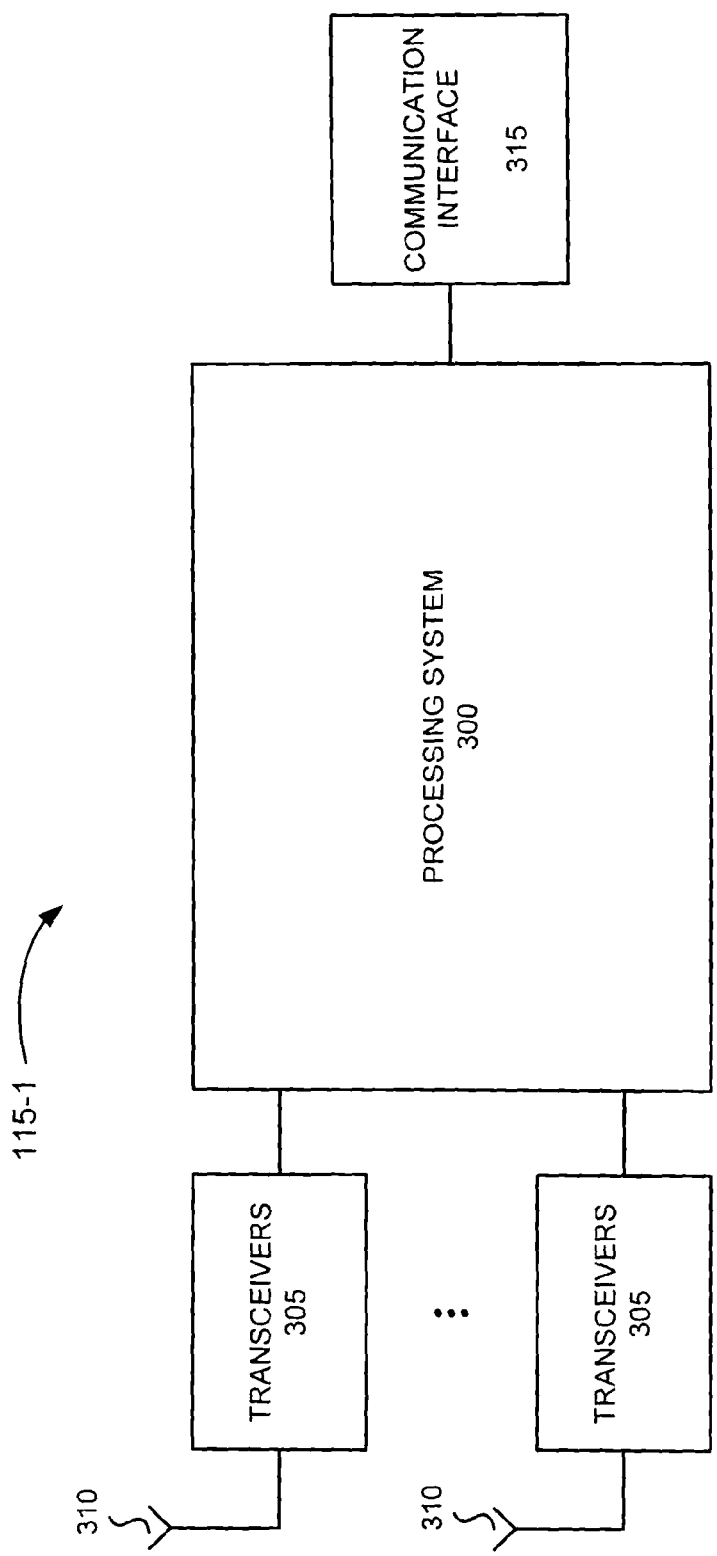
FIG. 3 is a diagram illustrating exemplary components that may correspond to the transmitters depicted in FIG. 1.

FIG. 3 is a diagram illustrating exemplary components of transmitter 115-1. Transmitters 115-2 through 115-T may be similarly configured. As illustrated, transmitter 115-1 may include a processing system 300, transceivers 305, antennas 310, and a communication interface 315. Transmitter 115-1 may include additional and/or different components than the components illustrated in FIG. 3.

Processing system 300 may control the operation of transmitter 115-1. Processing system 300 may also process information received via transceivers 305 and communication interface 315. Processing system 300 may include, for example, a general-purpose processor, a microprocessor, a data processor, a co-processor, a network processor, an application specific integrated circuit (ASIC), a controller, a programmable logic device, a chipset, a field programmable gate array (FPGA), or any other component or group of components that may interpret and execute instructions.

Transceivers 305 may be associated with antennas 310 and include transceiver circuitry for transmitting and/or receiving symbol sequences in a network, such as network 105, via antennas 310. Antennas 310 may include one or more directional and/or omni-directional antennas.

Communication interface 315 may include any transceiver-like mechanism that enables transmitter 115-1 to communicate with other devices and/or systems. For example, communication interface 315 may include a radio interface, an optical interface, an Ethernet interface, a coaxial interface, or some other type of interface for wired or wireless communication. In other words, communication interface 315 may allow for wired and/or wireless communication. Communication interface 315 may contain a group of communication interfaces to handle multiple traffic flows.

Although FIG. 3 illustrates exemplary components of transmitter 115-1, in other implementations, one or more components of transmitter 115-1 may be a component of a device other than transmitter 115-1.

Figure 4:
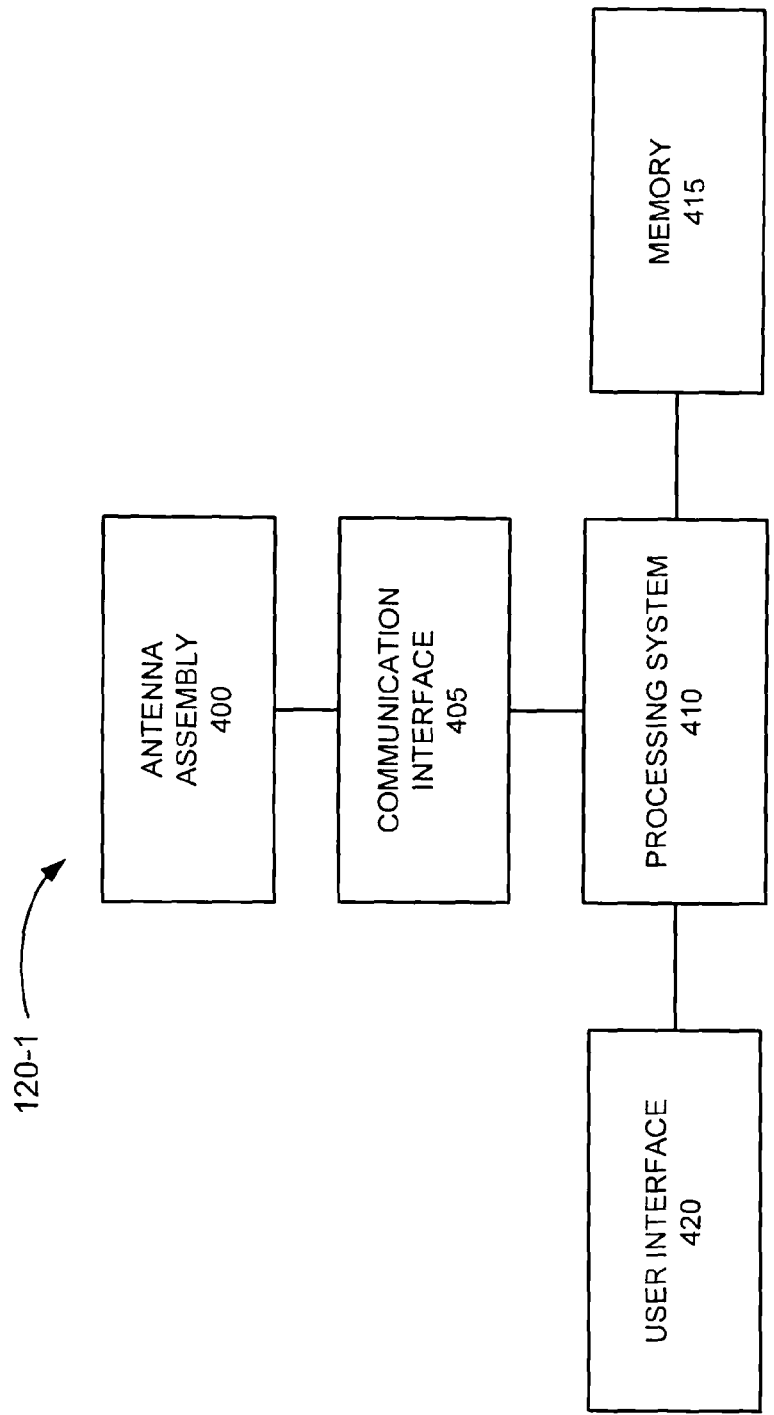
FIG. 4 is a diagram illustrating exemplary components that may correspond to the mobile devices depicted in FIG. 1.

FIG. 4 is a diagram illustrating exemplary components of mobile device 120-1. Mobile devices 120-2 through 120-M may be similarly configured. As illustrated, mobile device 120-1 may include an antenna assembly 400, a communication interface 405, a processing system 410, a memory 415, and a user interface 420. Mobile device 120-1 may include additional and/or different components than the components illustrated in FIG. 4.

Antenna assembly 400 may include one or more antennas to transmit and receive wireless signals over the air. Communication interface 405 may include, for example, a transmitter that may convert baseband signals from processing system 410 to radio frequency (RF) signals and/or a receiver that may convert RF signals to baseband signals.

Processing system 410 may control the operation of mobile device 120-1. For example, processing system 410 may include a general-purpose processor, a microprocessor, a data processor, a co-processor, a network processor, an application specific integrated circuit (ASIC), a controller, a programmable logic device, a chipset, a field programmable gate array (FPGA), or any other component or group of components that may interpret and execute instructions.

Memory 415 may include any type of unit that stores data and instructions related to the operation and use of mobile device 120-1. For example, memory 415 may include a storing unit, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

User interface 420 may include mechanisms for inputting information to mobile device 120-1 and/or for outputting information from mobile device 120-1. Examples of input and output mechanisms may include a speaker, a microphone, control buttons, a keypad, a display and/or a vibrator to cause mobile device 120-1 to vibrate.

Although FIG. 4 illustrates exemplary components of mobile device 120-1, in other implementations, one or more components of mobile device 120-1 may be a component of a device other than mobile device 120-1.

A description of processes that may be employed for determining the signals that may be transmitted to mobile devices jointly will be described. Based on the processes described below, data rates obtained by the mobile devices may be maximized under two constraints on the transmitted power. The first constraint may limit the total transmitted power from all of the transmitting antennas of the DAS. The second constraint may limit the power transmitted from each individual antenna of the DAS.

Figure 5:
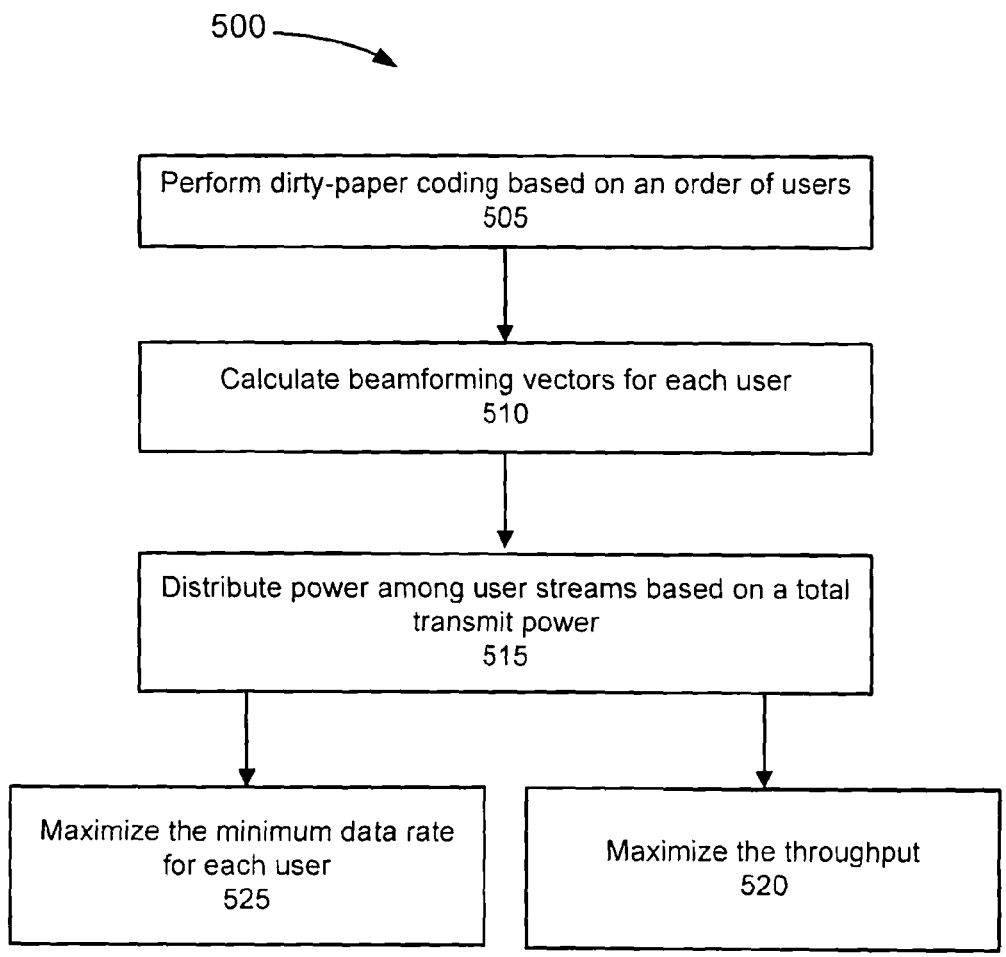
FIGS. 5 and 6 are flow diagrams related to processes associated with the concepts described herein.

FIG. 5 is a diagram illustrating an exemplary process 500 that may be employed when calculating downlink transmissions. In one implementation, beamforming vector calculator 205 and/or power distribution calculator 210 of controller 110 may perform one or more of the operations of process 500. In other implementations, process 500 may be performed by another device or group of devices including or excluding controller 110. For purposes of discussion, users (i) (i=1, 2, . . . , m) may operate in mobile devices 120 having (r) receiving antennas 125 per mobile device 120. Transmitters 115 may include (t) transmitters and all of transmitters 115 may not be co-located.

Process 500 may begin with performing dirty-paper coding based on an order of users (block 505). In one implementation, DPC may be employed to pre-code symbols and/or messages associated with users (i). In one implementation, the pre-coding of the symbols and/or messages associated with users (i) may be performed based on an order of users (i). In this instance, for example, DPC may be employed to pre-code symbols for user (i) so to eliminate the impact of interference from users (j<i) at mobile device 120 of user (i).

Beamforming vectors may be calculated for each user (block 510). For example, beamforming vectors may be calculated based on the following expressions provided below.

For purposes of discussion, the symbols transmitted on the (r) streams of user (i) may be expressed as $(x_{i,1}, x_{i,2}, \ldots x_{i,r})$, and the power of the symbol $x_{i,j}$ may be expressed as $(q_{i,j})$. Additionally, the beamforming vector used to transmit symbol $x_{i,j}$ may be expressed as $V_{i,j}$.

In the CP-ZFBF framework, the first user is free to use any beamforming vectors. Given the channel of the first user in matrix $H_1$, the choice for the beamforming vectors of user 1 may be the singular vectors of matrix $H_1$ that form the columns of the unitary matrix $W_1$, which may be represented by the following expression:

$$H_1 = U_1 \Lambda_1 W_1^\dagger, \quad (14)$$

where $U_1$, $\Lambda_1$, and $W_1$ are the Singular Value Decomposition (SVD) of the matrix $H_1$. Accordingly, only the diagonal entries of matrix $\Lambda_1$ are non-zero, and the non-zero entries of matrix $\Lambda_1$ may be expressed as, for example, $(\lambda_{1,1}, \lambda_{1,2}, \ldots \lambda_{1,r})$. In this case, user 1 then effectively sees (in) parallel AWGN channels, as represented by the following expression:

$$y_{1,l} = \lambda_{1,l} x_{1,l} + z_{1,l} \; l=1 \ldots r, \quad (15)$$

since the transmissions to all other users may be formed to deposit no interference at the antenna of user 1. The effective noises $z_{1,l}$'s may be i.i.d Gaussian with a variance of $\sigma_1^2$. The beamforming weights for user 1 may be the first (r) columns of $W_1$. Hence, the transmitted signal for user 1 may be represented by the following expression:

$$x_1 = \sum_{l=1}^{r} V_{1,l} x_{1,l}, \text{ and} \quad (16)$$

$$V_{1,l} = W_1(:,l). \quad (17)$$

Next, the optimal beamforming weights for user (i) may be calculated. Recall, that the transmitted signal for user (i) may be formed as a summation, which may be represented by the following expression:

$$x_i = \sum_{l=1}^{r} V_{i,l} x_{i,l}. \quad (18)$$

The beamforming vectors for user (i) may be chosen such that the transmission of $(x_i)$ does not deposit any interference on receiving antennas 125 of mobile devices (j<i) 120. That is, $(x_i)$ may satisfy the constraint, which may be represented by the following expression:

$$H_j x_i = 0 \; j=1, 2, \ldots, i-1. \quad (19)$$

Based on expression (19), (x) may be in the null space of the matrix $Q_i$. That is, the beamforming vectors for user (i) may belong to the null space of matrix $Q_i$. In one implementation, the Gram-Schmidt procedure may be used to determine an orthonormal basis for the null space of matrix Q. Further, this basis may include at most $N_i = t - (i-1)*r$ vectors. For purposes of discussion, a matrix $B_i$ may be formed, whose columns correspond to these basis vectors. For example, matrix $B_i$ may have a size of $(t*N_i)$. Accordingly, every vector satisfying expression (19) may be expressed as a linear combination of the columns of matrix $B_i$. In such an instance, $(x_i)$ may be represented by the following expression:

$$x_i = B_i \bar{x}_i, \quad (20)$$

where $(\bar{x}_i)$ is any vector of size $(N_i \cdot 1)$. Additionally, note that $\|x_i\| = \|\bar{x}_i\|$ since $B_i$ may include orthonormal columns.

Restricting the symbols for the i-th user to the form given in expression (20), and assuming that CP for users (j<i) has been applied, the effective channel seen by the i-th user may be represented by the following expression:

$$y_i = H_i B_i \bar{x}_i + z_i, \quad (21)$$

since the transmissions to all mobile devices (j>i) 120 may be formed to deposit no interference on receiving antenna 125 of user (i).

Subject to a power constraint on the vector signal transmitted for user (i) (e.g., subject to the constraint $E\|x_i\|^2 < P_i$), a determination may be made to find a set of beamforming vectors for user (i), $(V_{i,1}, \ldots, V_{i,r})$, that maximize the data rate delivered to user (i), and the resulting transmitted signal $(x_i)$ of expression (3) satisfies expression (19).

Since $\|x_i\| = \|\bar{x}_i\|$, and since $(x_i)$ satisfying expression (19) may be of the form $B_i \bar{x}_i$ for some $\bar{x}_i$, the above problem is equivalent to finding $\bar{x}_i$ in expression (21) that maximizes the mutual information between $y_i$ and $\bar{x}_i$. To solve this equivalent problem, $H_i B_i$ may be represented in a SVD forming according to the following expression:

$$H_i B_i = U_i \Lambda_i W_i^\dagger, \quad (22)$$

where the non-zero diagonal elements of $\Lambda$ may be denoted by $(\lambda_{i,1}, \lambda_{i,2}, \ldots, \lambda_{i,r})$. In this regard, an optimal choice for $\bar{x}_i$ may be represented by the following expression:

$$\bar{x}_i = \sum_{l=1}^{r} W_i(:,l) x_{i,l}, \quad (23)$$

where the corresponding optimal $x_i$ may be represented by the following expressions:

$$x_i = B_i \bar{x}_i \quad (24)$$

$$= \sum_{l=1}^{r} B_i W_i(:,l) x_{i,l}, \quad (25)$$

From expression (25) the optimal beamforming vectors for the i-th user may be represented by the following expression:

$$V_{i,l} = B_i W_i(:,l) \; l=1, 2, \ldots r. \quad (26)$$

Based on the beamforming vectors indicated in expression (26), the effective channel seen by the i-th user decomposes into m parallel AWGN channels that may be represented by the following expression:

$$y_{i,l} = \lambda_{i,l}^2 x_{i,l} + z_{i,l} \; l=1, 2, \ldots, r, \quad (27)$$

where $z_{i,j}$ are i.i.d. Gaussian noise with a variance of $\sigma_i^2$.

Recall that the $x_{i,l}$'s may be independent Gaussian symbols transmitted for user (i), and the variance of $x_{i,l}$ is $q_{i,l}$. Thus, the total power transmitted from the DAS in terms of $q_{i,l}$s may be represented by the following expressions:

$$E\|x\|^2 = E\left\{\left\|\sum_{i=1}^{m} x_i\right\|^2\right\} \quad (28)$$

$$= \sum_{i=1}^{m} \sum_{l=1}^{r} q_{i,l}. \quad$$

Returning to FIG. 5, power may be distributed among user streams based on a total transmit power (block 515). For example, the distribution of power may be calculated based on the expressions provided below.

Since the optimal beamforming vectors for all users have been determined, the distribution of total transmit power, P, among the various streams may be determined. That is, a criteria may be specified for choosing $q_{i,l}$'s subject to certain constraints (e.g. subject to total transmitted power from the DAS being less than P).

Given a set of $(g_{i,l}: i=1, \ldots, m; l=1, \ldots, r)$, the resulting data rate achieved by the i-th user may be represented by the following expression:

$$R_i = \sum_{l=1}^{r} \log\left(1 + \frac{\lambda_{i,l}^2 q_{i,l}}{\sigma_i^2}\right) \quad i=1, \ldots, m. \quad (30)$$

The throughput of the network may be maximized (block 520). For example, one performance criteria may be to maximize the overall system throughput (or sum rate), which may be represented by the following expressions:

$$\text{maximize} \sum_{i=1}^{m} R_i = \sum_{l,1} \log\left(1 + \frac{\lambda_{i,l}^2 q_{i,l}}{\sigma_i^2}\right) \quad (31)$$

$$\text{subject to:} \sum_{i,l} q_{i,l} < P. \quad (32)$$

This sum rate maximization may be considered as a waterfilling problem, and the solution may be found based on the following expressions:

$$q_{i,l} = \left(\frac{1}{\lambda} - \frac{\sigma_i^2}{\lambda_{i,l}^2}\right) \quad (33)$$

$$\sum_{i,l} \left(\frac{1}{\lambda} - \frac{\sigma_i^2}{\lambda_{i,l}^2}\right) = P. \quad (34)$$

The minimum data rate for each user may be maximized (block 525). For example, as an alternative criteria, the minimum rate obtained by any of the users (or maximize the minimum common rate) may be maximized, which may be represented by the following expressions:

$$\max \min R_i \quad (35)$$

$$\text{subject to:} \sum_{i,l} q_{i,l} < P. \quad (36)$$

The optimization problem in expression (27) may be alternatively expressed as:

$$\max \quad a \quad (37)$$

$$\text{subject to:} \quad a - R_i < 0 \quad i=1, \ldots, m \quad (38)$$

$$\sum_{i,l} q_{i,l} < P. \quad (39)$$

Since $R_i$ is a convex function of $q_{i,l}$'s, the optimization problem in expression (39) is a proper convex optimization problem with a unique global optimum. Further, a convex optimization method may be used to solve this problem. These methods may include, for example, the primal-dual interior-point method, the barrier method, gradient-descent methods, and/or the Newtwon-type methods for solving Via conditions. Given that the transmissions to different users do not interfere with each other, it may be concluded that maximization of the minimum rate may lead to all users obtaining equivalent rates.

Although FIG. 5 illustrates an exemplary process 500, in other implementations, fewer, different, or additional operations may be performed.

Figure 6:
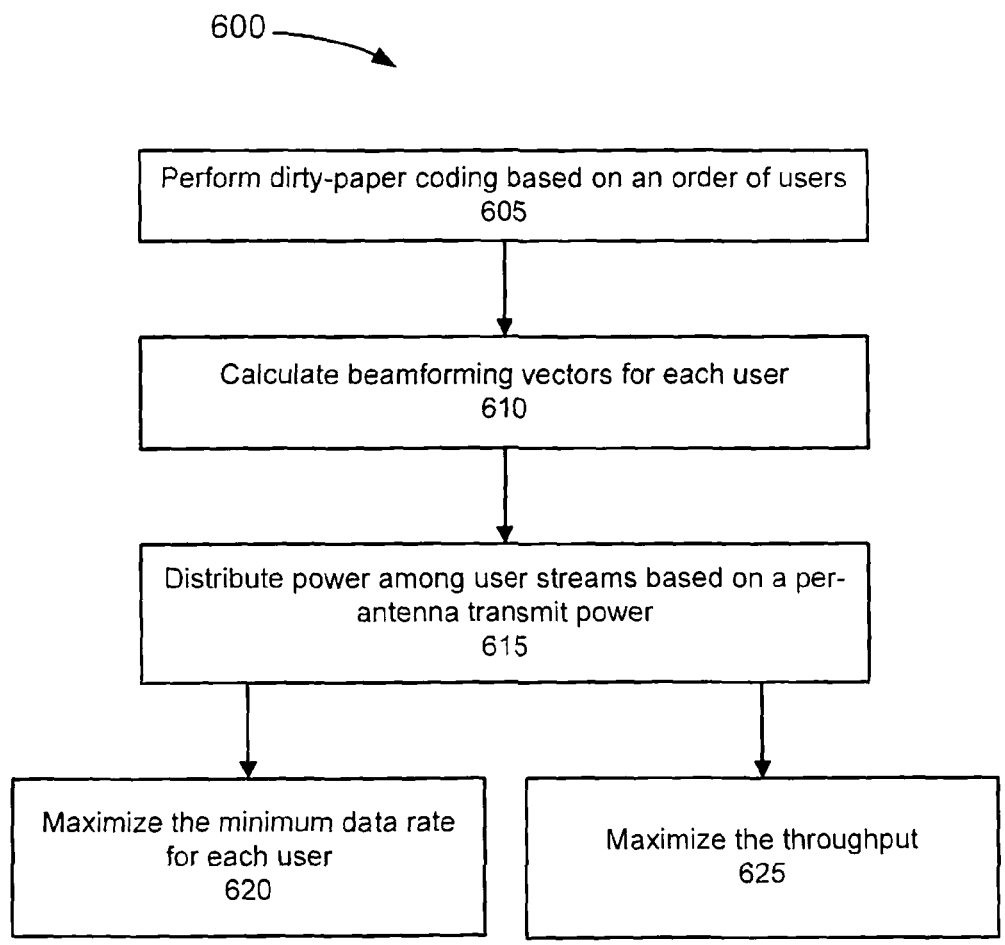

FIG. 6 is a diagram illustrating an exemplary process 600 that may be employed when calculating downlink transmissions. In one implementation, beamforming vector calculator 205 and power distribution calculator 210 of controller 110 may perform one or more of the operations of process 600. In other implementations, process 600 may be performed by another device or group of devices including or excluding controller 110.

Process 600 may begin by performing dirty-paper coding based on an order of users (block 605). In one implementation, DPC may be employed to pre-code symbols and/or messages associated with users (i). In one implementation, pre-coding of the symbols and/or messages associated with users (i) may be performed based on an order of users (i). In this instance, for example, DPC may be employed to pre-code symbols for user (i) so to eliminate the impact of interference from users (j<i) at mobile device 120 of user (i).

Beamforming vectors may be calculated for each user (block 610). For example, beamforming vectors may be calculated based on the expressions previously described in connection to block 510 of FIG. 5. Accordingly, a description of the operations associated with block 610 has been omitted.

The power may be distributed among user streams based on a per-antenna transmit power (block 615). For example, the distribution of power among user streams based on a per-antenna transmit power may be calculated based on the following expressions provided below.

Assume that the total transmitted power from the k-th transmitted antenna (e.g., associated at a transmitter 115) must be less than $P_k$. In such an instance, the total power transmitted from the k-th antenna may be expressed as a linear function of $q_{i,l}$'s. That is, the per-antenna constraint associated with transmit antenna k may be represented by the following expression:

$$\sum_{i=1}^{m}\sum_{l=1}^{r}|V_{i,l}(k)|^2 q_{i,l} < P_k, \quad (40)$$

where $V_{i,l}(k)$ denotes the k-th element of the vector $V_{i,l}$. Additionally, all of the coefficients multiplied with $q_{i,l}$'s in expression (40) are known, scalar-valued constraints since the beamforming vectors for all of the users have already been determined.

The minimum data rate for each user may be maximized (block 620). For example, the minimum data rate for each user may be calculated based on the following expressions provided below.

Maximizing a minimum data rate based on a per-antenna power constraint may be represented by the following expressions:

$$\max \quad a \quad (41)$$

$$\text{subject to:} \quad a - R_i < 0 \quad i = 1, \ldots, m \quad (42)$$

$$\sum_{i=1}^{m}\sum_{l=1}^{r}|V_{i,j}(k)|^2 q_{i,l} < P_k \quad k = 1, \ldots l. \quad (43)$$

Based on expression (43), the maximization of the minimum rate subject to a per-antenna power constraint may be considered a convex optimization problem that may be solved employing a convex optimization method. These methods may include, for example, the primal-dual interior-point method, the barrier method, gradient-descent methods, and/or the Newtwon-type methods for solving KKT conditions.

The throughput of the network may be maximized (block 625). In one embodiment, the overall system throughput (or the sum rate), subject to a per-antenna power constraint, may be represented by the following expressions:

$$\text{maximize} \sum_{i=1}^{m} R_i = \sum_{i,l} \log\left(1 + \frac{\lambda_{i,l}^2 q_{i,l}}{\sigma_i^2}\right) \quad (44)$$

$$\text{subject to:} \sum_{i=1}^{m}\sum_{l=1}^{r}|V_{i,l}(k)|^2 q_{i,l} < P_k \quad (45)$$

Based on expressions (44) and (45), the maximization of the overall system throughput subject to a per-antenna constraint may be obtained based on a convex optimization algorithm since both the optimization criteria and the constraints are convex functions of $q_{i,l}$'s. The convex optimization may be solved employing various methods, such as, the primal-dual interior point method, the barrier method, gradient-decent methods, or the Newton-type methods for solving the KKT conditions.

Although, FIG. 6 illustrates an exemplary process 600, in other implementations, fewer, different, or additional operations may be performed.

Conclusion

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to processes illustrated in FIG. 5 and FIG. 6, the order of the blocks may be modified in other implementations. Further, non-dependent blocks may be performed in parallel. Further, one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. In a distributed antenna system that includes a plurality of transmitters and a controller, a method, performed by the controller, comprising:
   performing dirty-paper coding on downlink transmissions to users based on an order of the users;
   calculating beamforming vectors to provide that each of the downlink transmissions associated with each of the users does not interfere with other users;
   distributing power among user streams based on a total transmit power; and
   maximizing, based on the calculated beamforming vectors, a data rate subject to a power constraint of the distributed antenna system.

2. The method of claim 1, where the calculating comprises: assigning beamforming weights to each of the users.

3. The method of claim 1, where the calculating comprises:
   generating a matrix defining channels to the users; and
   determining beamforming vectors based on an orthonormal basis of a null space of the matrix.

4. The method of claim 1, where the maximizing comprises:
   maximizing an overall throughput data rate subject to the power constraint.

5. The method of claim 4, where the maximizing comprises:
   maximizing the overall throughput data rate subject to a total transmit power constraint of the distributed antenna system.

6. The method of claim 4, where the maximizing comprises:
   maximizing the overall throughput data rate subject to a per-antenna transmit power constraint of the distributed antenna system.

7. The method of claim 1, where the maximizing comprises:
   maximizing a minimum data rate for each of the users subject to the power constraint.

8. The method of claim 7, where the maximizing comprises:
   maximizing the minimum data rate for each of the users subject to a total transmit power constraint of the distributed antenna system.

9. The method of claim 8, where the maximizing comprises:
   maximizing the minimum data rate as a minimum data rate equal to each of the users.

10. The method of claim 7, where the maximizing comprises:
    maximizing the minimum data rate for each of the users subject to a per-antenna transmit power constraint.

11. The method of claim 7, further comprises:
    determining a global minimum data rate value based on a convex optimization algorithm.

12. The method of claim 1, where the maximizing comprises:
    determining a total transmit power constraint of the distributed antenna system based on a variance of the downlink transmissions.

13. The method of claim 1, where the maximizing comprises:
    determining a transmit power of an antenna of the distributed antenna system based on a beamforming vector of the beamforming vectors corresponding to the antenna.

14. A controller for coordinating data transmissions by antennas of a distributed antenna system, the controller comprising:
    a memory to store instructions; and
    a processor to execute the instructions to:
    select beamforming vectors associated with the distributed antenna system for transmission of data to users, where the beamforming vectors do not cause data transmissions to interfere with each other; and
    maximize, based on the selection of beamforming vectors, a data rate,
    wherein power is distributed among user streams based on a total transmit power.

15. The controller of claim 14, where, when selecting beamforming vectors, the processor is configured to:
    perform singular value decomposition of a matrix including channels associated with the users.

16. The controller of claim 14, where, when maximizing the data rate, the processor is configured to:
    maximize the data rate subject to a power constraint of the distributed antenna system.

17. The controller of claim 16, where the power constraint includes a per-antenna transmit power constraint of the distributed antenna system.

18. The controller of claim 16, where the power constraint includes a total transmit power constraint of the distributed antenna system.

19. The controller of claim 14, where the data rate includes a maximum minimum data rate to the users.

20. The controller of claim 14, where the data rate includes an overall throughput of the distributed antenna system.

21. The controller of claim 20, where, when selecting beamforming vectors, the processor is configured to:
    select beamforming weights and beamforming powers.

22. The controller of claim 21, where, when maximizing the overall throughput, the processor is configured to:
    determine the maximum throughput of the distributed antenna system based on the beamforming powers.

23. The controller of claim 14, where, when maximizing the data rate, the processor is configured to:
    determine a maximum global minimum data rate based on a convex optimization algorithm.

24. The controller of claim 14, where, when maximizing the data rate, the processor is configured to:
    maximize an overall throughput data rate of the distributed antenna system based on a variance of the downlink transmissions.

25. The controller of claim 14, where, when maximizing the data rate, the processor is configured to:

maximize the data rate so that the users are getting an equal data rate.

26. A non-transitory computer-readable medium containing instructions executable by a controller associated with base stations of a distributed antenna system, the computer-readable medium comprises:

one or more instructions for calculating beamforming vectors relating to downlink transmissions to users located in a plurality of cells based on an order of the users; and one or more instructions for maximizing a data rate subject to a transmit power constraint of the distributed antenna system, wherein power is distributed among user streams based on a total transmit power.

27. The non-transitory computer-readable medium of claim 26, where the one or more instructions for maximizing comprise:

one or more instructions for calculating a maximum throughput of the distributed antenna system based on a variance of the downlink transmissions.

28. The non-transitory computer-readable medium of claim 27, where the one or more instructions for calculating the maximum throughput comprise:

one or more instructions for calculating the maximum throughput subject to a total transmit power constraint of the distributed antenna system.

29. The non-transitory computer-readable medium of claim 27, where the one or more instructions for calculating the maximum throughput comprise:

one or more instructions for calculating the maximum throughput subject to a per-antenna transmit power constraint of the distributed antenna system.

30. The non-transitory computer-readable medium of claim 26, where the one or more instructions for maximizing comprise:

one or more instructions for calculating a maximum minimum data rate for each of the users.

31. The non-transitory computer-readable medium of claim 30, where the maximum minimum data rate is equal for each of the users.

32. The non-transitory computer-readable medium of claim 30, where the one or more instructions for maximizing comprise:

one or more instructions for calculating the maximum minimum data rate subject to a total transmit power constraint of the distributed antenna system.

33. The non-transitory computer-readable medium of claim 30, where the one or more instructions for maximizing comprise:

one or more instructions for calculating the maximum minimum data rate subject to a per-antenna transmit power constraint of the distributed antenna system.

34. The non-transitory computer-readable medium of claim 26, where the one or more instructions for calculating comprise:

one or more instructions for generating a channel matrix representing channels associated with the users.

35. The non-transitory computer-readable medium of claim 34, further comprising one or more instructions for calculating a null space of the channel matrix.

36. The non-transitory computer-readable medium of claim 35, further comprising:

one or more instructions for determining an orthonormal basis to the null space.

37. The non-transitory computer-readable medium of claim 26, where the one or more instructions for maximizing comprise:

one or more instructions for maximizing the data rate based on a variance of the downlink transmissions.

* * * * *

UNITED STATES PATENT AND TRADEMARK OFFICE
CERTIFICATE OF CORRECTION

PATENT NO. : 8,526,992 B2
APPLICATION NO. : 12/746372
DATED : September 3, 2013
INVENTOR(S) : Hui et al.

It is certified that error appears in the above-identified patent and that said Letters Patent is hereby corrected as shown below:

In the Specification

In Column 5, Line 4, delete "H" and insert -- $\mathbf{H}$ --, therefor.

In Column 5, Line 19, delete "Q" and insert -- $Q_i$ --, therefor.

In Column 10, Line 18, in Equation (15), delete " $y_{1,j} = \lambda_{1,j} x_{1,j} + z_{1,j}$ " and insert -- $y_{1,j} = \lambda_{1,j}^2 x_{1,j} + z_{1,j}$ --, therefor.

In Column 10, Line 44, delete "($X_t$)" and insert -- ($X_i$) --, therefor.

In Column 10, Line 46, delete "($X_t$)" and insert -- ($X_i$) --, therefor.

In Column 10, Line 49, in Equation (19), delete " $H_j \mathbf{x}_t = 0$ " and insert -- $H_j \mathbf{x}_i = 0$ --, therefor.

Signed and Sealed this
Seventh Day of October, 2014

Michelle K. Lee
*Deputy Director of the United States Patent and Trademark Office*